United States Patent
Khachatryan et al.

(10) Patent No.: US 11,842,659 B2
(45) Date of Patent: Dec. 12, 2023

(54) DISPLAY APPARATUS

(71) Applicant: Samsung Display Co., Ltd., Yongin-si (KR)

(72) Inventors: Hayk Khachatryan, Hwaseong-Si (KR); Hyunwoo Koo, Hwaseong-Si (KR); Taewoong Kim, Seongnam-Si (KR); Jeongho Kim, Suwon-Si (KR); Hyungsik Kim, Suwon-Si (KR); Dongwon Choi, Seoul (KR); Jin Hwan Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 513 days.

(21) Appl. No.: 17/258,732

(22) PCT Filed: Oct. 19, 2018

(86) PCT No.: PCT/KR2018/012370
§ 371 (c)(1),
(2) Date: Jan. 7, 2021

(87) PCT Pub. No.: WO2020/013390
PCT Pub. Date: Jan. 16, 2020

(65) Prior Publication Data
US 2021/0272486 A1    Sep. 2, 2021

(30) Foreign Application Priority Data
Jul. 10, 2018    (KR) .......................... 10-2018-0079787

(51) Int. Cl.
*G09F 9/30* (2006.01)
*G09F 9/37* (2006.01)

(52) U.S. Cl.
CPC ................ *G09F 9/301* (2013.01); *G09F 9/37* (2013.01)

(58) Field of Classification Search
CPC .................................. G09F 9/301; G09F 9/37
See application file for complete search history.

(56) References Cited

U.S. PATENT DOCUMENTS 8,151,501 B2    4/2012    Bemelmans et al.
8,199,471 B2    6/2012    Bemelmans et al.
(Continued)

FOREIGN PATENT DOCUMENTS

CN    102956157 A    3/2013
CN    104507741 A    4/2015
(Continued)

OTHER PUBLICATIONS

Office Action dated Jul. 5, 2022 for corresponding Chinese Patent Application No. 201880095403.5 (12 pages).
(Continued)

*Primary Examiner* — Lisa Lea-Edmonds
(74) *Attorney, Agent, or Firm* — Lewis Roca Rothgerber Christie LLP

(57) ABSTRACT

A display apparatus according to an embodiment of the present invention includes a display unit having flexibility, at least one roller extending in a first direction to wind or unwind the display unit, a plurality of joints extending along an edge region of the display unit, and a housing in which the display unit, the roller, and the joints are accommodated and into/from which the display unit and the joints are inserted and withdrawn, wherein the display unit includes a display panel having flexibility and in which a display area displaying an image is changed as the display unit is wound around or unwound from the roller, a protective film disposed above the display panel, and a support panel disposed below the display panel.

20 Claims, 11 Drawing Sheets

(56) References Cited

U.S. PATENT DOCUMENTS

| | | | |
|---|---|---|---|
| 9,007,350 B2 | 4/2015 | Burgin et al. | |
| 9,685,100 B2 | 6/2017 | Choi et al. | |
| 9,698,362 B2 | 7/2017 | Kim | |
| 9,730,318 B2 | 8/2017 | Choi et al. | |
| 9,747,822 B2 | 8/2017 | Lee et al. | |
| 9,860,353 B2 * | 1/2018 | Lee | H04M 1/0268 |
| 9,870,029 B2 | 1/2018 | Kim et al. | |
| 10,135,018 B2 | 11/2018 | Seo et al. | |
| 10,136,524 B2 * | 11/2018 | Choi | H05K 5/0217 |
| 10,143,095 B2 * | 11/2018 | Kim | H05K 5/0217 |
| 10,162,387 B2 | 12/2018 | Takayanagi et al. | |
| 10,198,041 B2 | 2/2019 | Myeong et al. | |
| 10,209,434 B2 | 2/2019 | Choi et al. | |
| 10,274,995 B2 | 4/2019 | Seo et al. | |
| 10,321,583 B2 | 6/2019 | Seo et al. | |
| 10,321,584 B2 * | 6/2019 | Choi | G02F 1/133305 |
| 10,362,690 B2 | 7/2019 | Han | |
| 10,588,223 B2 * | 3/2020 | Han | G09F 9/301 |
| 10,595,408 B2 | 3/2020 | Lim et al. | |
| 10,617,017 B2 | 4/2020 | Park et al. | |
| 10,671,124 B2 * | 6/2020 | Kim | H05K 5/0017 |
| 10,863,633 B2 * | 12/2020 | Choi | H05K 5/0017 |
| 2002/0104769 A1 | 8/2002 | Kim et al. | |
| 2010/0177020 A1 | 7/2010 | Bemelmans et al. | |
| 2012/0314399 A1 | 12/2012 | Bohn et al. | |
| 2013/0038584 A1 | 2/2013 | Burgin et al. | |
| 2015/0256658 A1 | 9/2015 | Shin et al. | |
| 2016/0155965 A1 * | 6/2016 | Kusuura | H10K 71/50 29/829 |
| 2016/0161983 A1 * | 6/2016 | Lee | G09F 9/301 361/749 |
| 2016/0165717 A1 | 6/2016 | Lee et al. | |
| 2016/0209879 A1 * | 7/2016 | Ryu | G06F 1/1652 |
| 2016/0374228 A1 * | 12/2016 | Park | G09F 9/301 |
| 2017/0278436 A1 * | 9/2017 | Chu | H10K 77/111 |
| 2018/0049328 A1 * | 2/2018 | Choi | H04M 1/0268 |
| 2018/0098440 A1 * | 4/2018 | Choi | H05K 5/0017 |
| 2018/0110137 A1 * | 4/2018 | Kim | G02F 1/133305 |
| 2019/0029131 A1 * | 1/2019 | Han | H05K 5/03 |
| 2019/0138058 A1 * | 5/2019 | Kwon | G09G 3/22 |
| 2019/0254180 A1 * | 8/2019 | Choi | G06F 1/1624 |

FOREIGN PATENT DOCUMENTS

| | | |
|---|---|---|
| CN | 105551385 A | 5/2016 |
| CN | 105590554 A | 5/2016 |
| CN | 105741683 A | 7/2016 |
| CN | 106097896 A | 11/2016 |
| CN | 106249474 A | 12/2016 |
| CN | 107799010 A | 3/2018 |
| CN | 107919062 A | 4/2018 |
| CN | 108109520 A | 6/2018 |
| KR | 10-2008-0049300 A | 6/2008 |
| KR | 10-2015-0133886 A | 12/2015 |
| KR | 10-2016-0066105 A | 6/2016 |
| KR | 10-2016-0069556 A | 6/2016 |
| KR | 10-2016-0129669 A | 11/2016 |
| KR | 10-2016-0141254 A | 12/2016 |
| KR | 10-2017-0095636 A | 8/2017 |
| KR | 10-2017-0143112 A | 12/2017 |
| KR | 10-2018-0001636 A | 1/2018 |
| KR | 10-2018-0013295 A | 2/2018 |
| KR | 10-2018-0039799 A | 4/2018 |
| WO | WO 2008/054206 A2 | 5/2008 |

OTHER PUBLICATIONS

Chinese Office Action dated Jan. 20, 2023 issued in corresponding Chinese Patent Application No. 201880095403.5 (6 pages).

* cited by examiner

DISPLAY APPARATUS

CROSS-REFERENCE TO RELATED APPLICATIONS

This application is a National Phase Patent Application and claims priority to and the benefit of International Application Number PCT/KR2018/012370, filed on Oct. 19, 2018, which claims priority to Korean Patent Application Number 10-2018-0079787, filed on Jul. 10, 2018, the entire contents of each of which are incorporated herein by reference.

FIELD

Aspects of the present invention relate to a display apparatus.

BACKGROUND ART

Recently, various flexible display apparatuses having warpage characteristics and increased convenience have been developed. As a flexible display apparatus, a curved display apparatus fixed in a state of having a specific curvature, a foldable display apparatus that is capable of being bent beyond a specific curvature radius or bent with respect to a folding axis, and a rollable display apparatus that is capable of being rollable with a specific curvature radius are being developed.

Among them, the rollable display apparatus has a large display area and excellent portability. When the rollable display apparatus is in an unfolded state, a support member for supporting a display panel that displays an image is required.

SUMMARY

According to an aspect of embodiments of the present invention a display apparatus having improved durability and increased convenience is provided.

A display apparatus according to one or more embodiments of the present invention includes: a display unit having flexibility; at least one roller extending in a first direction to wind or unwind the display unit; a plurality of joints extending along an edge region of the display unit; and a housing in which the display unit, the at least one roller, and the plurality of joints are accommodated and into and from which the display unit and the plurality of joints are inserted and withdrawn, wherein the display unit includes: a display panel having flexibility and in which a display area to display an image is changed as the display unit is wound around or unwound from the roller; a protective film above the display panel; and a support panel below the display panel.

The joints may be connected to both edges of the display panel in the first direction to extend in a second direction perpendicular to the first direction on a plane outside the housing, and the joints may be bent in a direction toward a center of the housing from the first direction to extend in the first direction inside the housing.

The joints may not be bent in directions other than the direction toward the center of the housing from the first direction.

The joints may be bent to be accommodated at the outermost side in the second direction inside the housing.

Each of the joints may include a plurality of joint units arranged along the extension direction of the joints and a connection member configured to connect the adjacent joint units to each other among the plurality of joint units, wherein each of the joint units may rotate about the connection member.

At least one groove extending parallel to the extension direction of the joint may be defined in a surface of each of the joint units, and an edge region of at least a portion of the display unit may be inserted into the groove.

The groove may be provided as a plurality of grooves, and each of the plurality of grooves may include a first groove into which an edge region of the protective film is inserted and a second groove into which an edge region of the support panel is inserted.

The display unit may further include a coupling member arranged along the edge region of the display unit, and at least one of the coupling member or the joints may include a magnetic material.

The joints may be accommodated to be spaced apart from the display unit inside the housing.

The roller may be provided as a plurality of rollers, and the plurality of rollers may include a first roller configured to wind the display panel and a second roller configured to wind the protective film, and the display panel and the protective film may be combined with each other inside the housing and be withdrawn to the outside of the housing.

The first to third rollers may be arranged in a second direction perpendicular to the first direction on a plane, and the first roller may be arranged at the outermost side of the housing.

The joints may be bent inside the housing and accommodated inside the first roller in the second direction.

A first opening and a second opening may be defined in the housing, the display unit and the joints may be inserted and withdrawn through the first opening, and a portion of the display panel, which is not withdrawn from the first opening, may be exposed by the second opening.

The plurality of rollers may further include a third roller configured to wind the support panel, and the display panel, the protective film, and the support panel may be combined with each other inside the housing and withdrawn to the outside of the housing.

The display unit may further include an auxiliary film which is wound together with the display panel and disposed between the display panel and the support panel as the display unit is unfolded, and at least one of the auxiliary film or the support panel may include a magnetic material.

The support panel may include a metal.

The support panel may have a chain shape comprising the plurality of joints.

The display apparatus may further include a handle which extends in the first direction, is connected to an end of the display unit and an end of each of the joints, and faces the housing in a second direction perpendicular to the first direction on a plane.

A display apparatus according to one or more embodiments of the present invention includes: a display unit which is rolled around a rotation shaft extending in a first direction, unfolded in a second direction perpendicular to the first direction, and configured to display an image; a plurality of joints, each of which extends along sides of the display unit which are parallel to the second direction and fixes sides of a display panel which are parallel to the second direction; and a housing in which the rotation shaft, the display unit, and the plurality of joints are accommodated and into and from which the display panel and the plurality of joints are to be inserted or withdrawn, wherein each of the joints is bent in a direction surrounding the display unit on a plane and is not bent in a direction opposite to the direction surrounding the display unit inside the housing.

A display apparatus according to one or more embodiments of the present invention includes: at least one roller; a display unit wound or unwound by the at least one roller; a plurality of joints connected to an edge region of the display unit to fix the display unit; and a housing in which the display unit, the roller, and the joints are accommodated and into/from the display unit and the joints are inserted and withdrawn, wherein the display unit includes a display panel configured to display an image and inserted into and withdrawn from the housing such that an area of a display area varies; an auxiliary film disposed below the display panel and comprising a magnetic material; and a support panel disposed below the auxiliary film and comprising a metal material.

According to an aspect of embodiments of the present invention, the durability of the display apparatus may be improved, and the convenience of the display apparatus may be increased.

DETAILED DESCRIPTION

Figure 1:
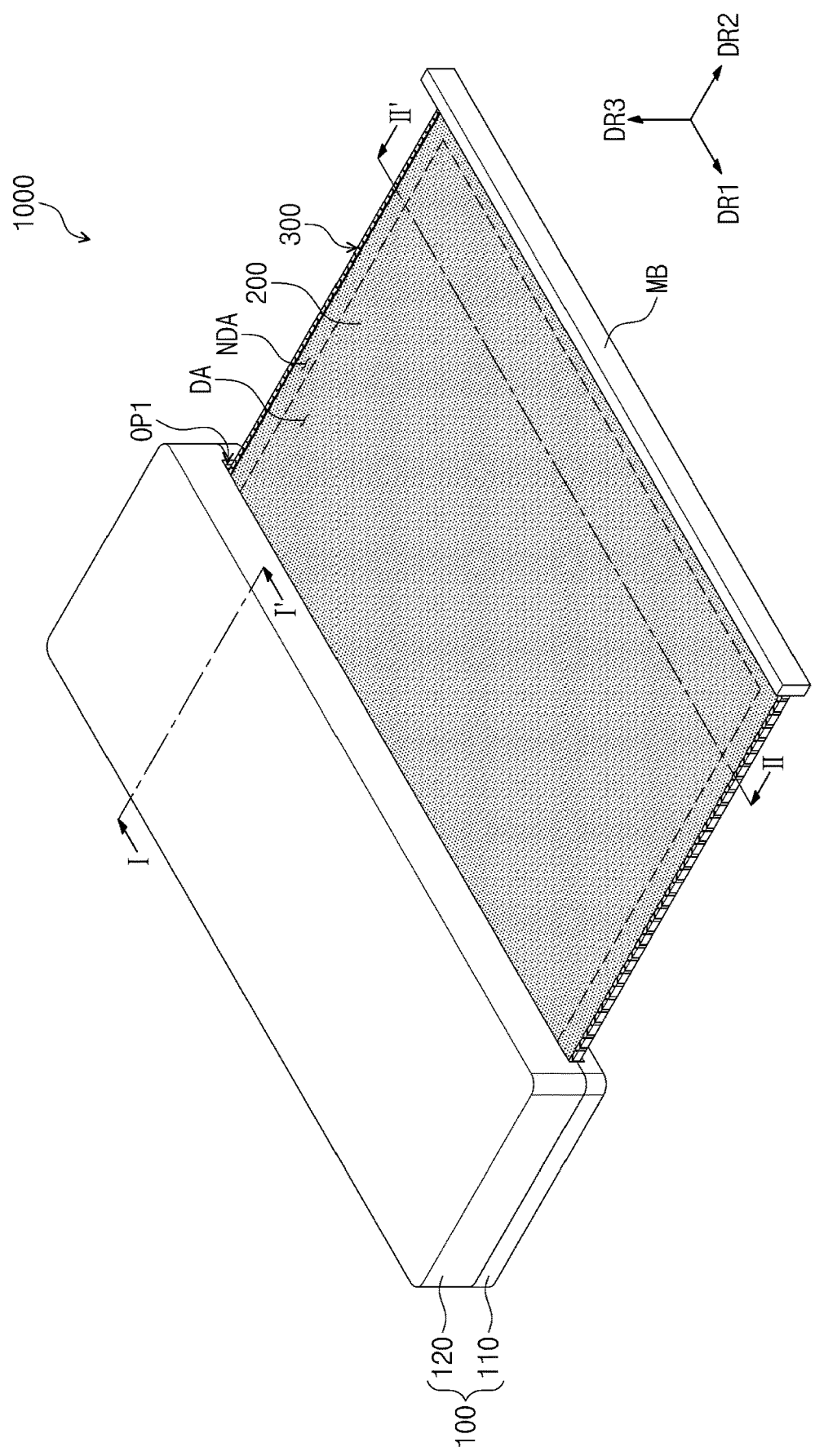
FIG. 1 is a perspective view of a display apparatus according to an embodiment of the present invention.

Aspects and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that the present invention will be thorough and complete, and will fully convey the scope of the present invention to those skilled in the art. Further, the present invention is defined by the scope of the claims. Like reference numerals refer to like elements throughout.

It is to be understood that when a layer is referred to as being "on" another layer or substrate, it can be directly on the other layer or substrate, or one or more intervening layers may also be present. In contrast, when an element is referred to as being "directly on" another element or layer, there are no intervening elements or layers present.

As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. The spatially relative terms should be understood as terms which include different directions of elements in addition to directions illustrated in the figures when using or operating the present invention. Like reference numerals refer to like elements throughout.

It is to be understood that although the terms "first" and "second" are used herein to describe various elements and/or sections, these elements and/or sections should not be limited by these terms. These terms are only used to distinguish one element, component, or section from another element, component, or section. Accordingly, a first element, a first component, or a first section described below may be a second element, a second component, or a second section within the technical idea of the present invention.

The embodiments in the detailed description may be described with schematic cross-sectional views and/or plan views as exemplary views of the present invention. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the present invention.

Unless otherwise defined, all terms (including technical and scientific terms) used herein have the same meaning as commonly understood by one of ordinary skill in the art to which example embodiments of the inventive concepts belong. It is to be further understood that terms, such as those defined in commonly-used dictionaries, should be interpreted as having a meaning that is consistent with their meaning in the context of the relevant art and are not be interpreted in an idealized or overly formal sense unless expressly so defined herein.

Herein, some example embodiments of the present invention will be described below in further detail with reference to the accompanying drawings.

Figure 2:
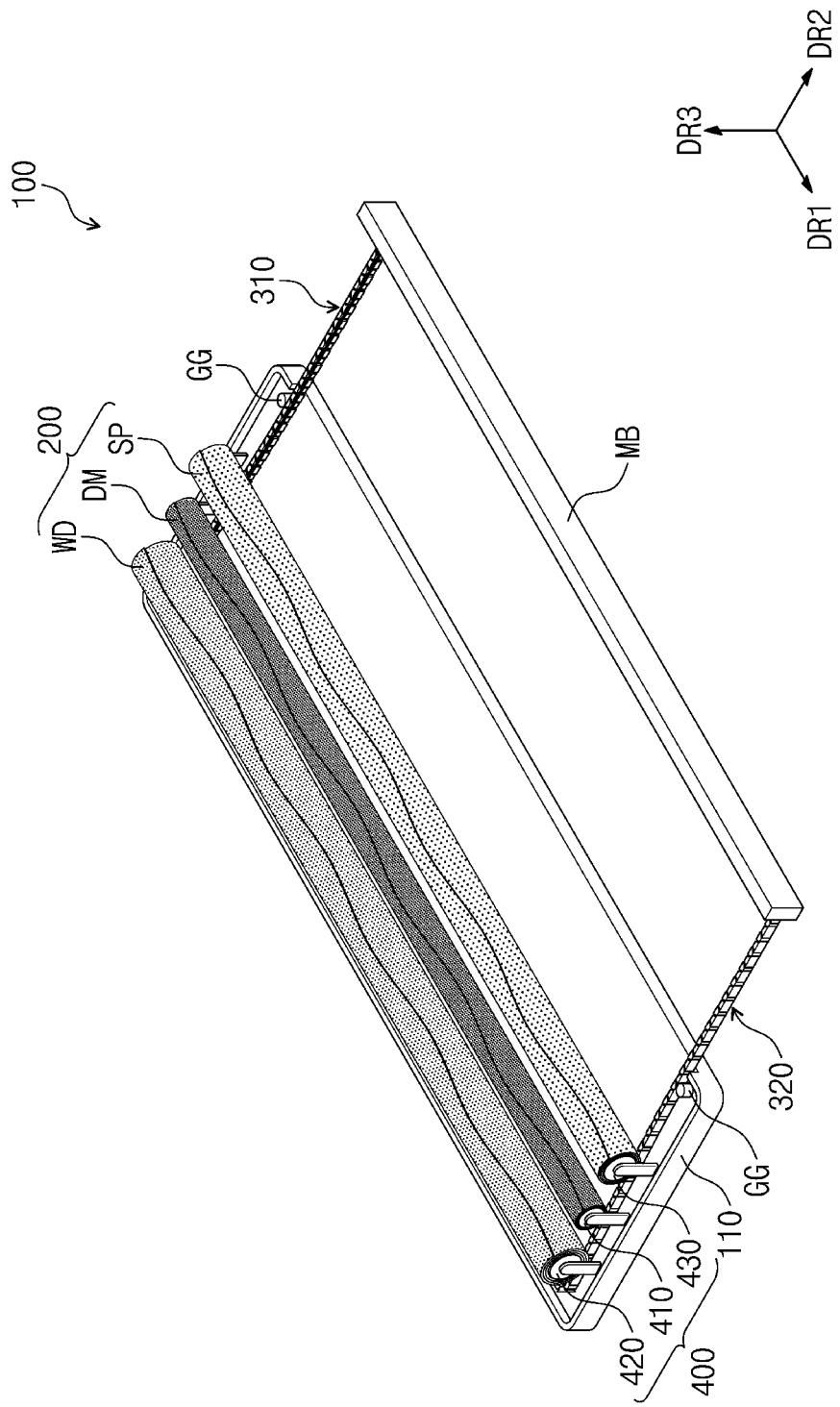
FIG. 2 is a view illustrating an internal configuration of a housing illustrated in FIG. 1.

FIG. 1 is a perspective view of a display apparatus according to an embodiment of the present invention; and FIG. 2 is a view illustrating an internal configuration of a housing illustrated in FIG. 1.

Referring to FIGS. 1 and 2, a display apparatus 1000 according to an embodiment of the present invention includes a housing 100, a display unit 200, a support joint 300, and a roller unit 400.

The housing 100 has a rigid characteristic. The housing 100 accommodates the display unit 200, the support joint 300, and the roller unit 400, which will be described later.

The housing 100 includes a lower housing 110 and an upper housing 120. The lower housing 110 defines a bottom surface of the housing 100. The upper housing 120 is coupled to the lower housing 110 to define a storage space. The lower housing 110 and the upper housing 120 may have an integrated shape.

According to an embodiment, a first opening OP1 may be defined in a side surface of the housing 100 in a second direction DR2. The display unit 200 and the support joint 300, which will be described later, may be inserted or withdrawn through the first opening OP1.

In this embodiment, the display unit 200 has a rectangular shape. In an embodiment, the display unit 200 has sides defined on a plane and parallel to each of the first and second directions DR1 and DR2 that are perpendicular to each other.

One side of the display unit 200 is fixed to the housing 100 in the second direction DR2. The display unit 200 has flexibility. That is, the display unit 200 may have a rollable characteristic. Thus, when the display apparatus 1000 is in a closed mode, the display unit 200 is wound and accommodated in the housing 100, and when the display apparatus 1000 is in an open mode, the display unit 200 may be unwound in an opposite direction of the winding direction and withdrawn from the housing 100 in the second direction DR2.

According to an embodiment, a display area DA and a non-display area NDA may be defined on the display unit 200 exposed to the outside of the housing 100. The display area DA is defined in a central area on the display unit 200, which is exposed to the outside. An image is displayed on the display area DA.

According to an embodiment, as the display unit 200 is wound or unwound, the area of the display unit 200, which is exposed to the outside of the housing 100, may be changed. That is, as the display unit 200 is wound or unwound, a length of the display area DA of the display unit 200 in the second direction DR2 may vary.

In an embodiment, the non-display area NDA is defined to surround the display area DA. An image is not displayed on the non-display area NDA. However, the present invention is not limited thereto, and the non-display area NDA may not be defined on the exposed display unit 200 according to another embodiment of the present invention. That is, according to another embodiment of the present invention, an image may be displayed through an exposed front surface of the display unit 200.

The display unit 200 may have a shape in which a plurality of members WD, DM, and SP are laminated. In this regard, it will be described later in further detail with reference to FIGS. 3 and 4.

When the display apparatus 1000 is in the open mode, the support joint 300 serves to fix the display unit 200. When the display apparatus 1000 is in the closed mode, the support joint 300 is accommodated in the housing 100, and when the display apparatus 1000 is in the open mode, the support joint 300 is withdrawn from the housing 100 to fix the display unit 200.

The support joint 300 includes a plurality of joints 310 and 320. In an embodiment, the support joint 300 includes a first joint 310 and a second joint 320. When the display apparatus 1000 is in the open mode, the first joint 310 exposed to the outside of the housing 100 is connected to one side of the display unit 200 in the first direction DR1, and the second joint 320 is connected to the other side of the display unit 200 in the first direction DR1. That is, when the display apparatus 1000 is in the open mode, the display unit 200 may be disposed between the first joint 310 and the second joint 320.

Each of the first joint 310 and the second joint 320 has a rigid characteristic. Thus, when the display apparatus 1000 is in the open mode, the display unit 200 withdrawn to the outside of the housing 100 may be fixed parallel to the plane defined by the first direction DR1 and the second direction DR2. For example, each of the first joint 310 and the second joint 320 may include a metal. However, the present invention is not particularly limited to the material of each of the first joint 310 and the second joint 320.

According to an embodiment, each of the first joint 310 and the second joint 320 may be bent in a direction (e.g., a predetermined direction) inside the housing 100. In an embodiment, the first joint 310 and the second joint 320 are bent on the plane defined by the first direction DR1 and the second direction DR2 and are not bent in the third direction DR3. This will be described in further detail with reference to FIGS. 8A and 8B.

The roller unit 400 is accommodated in the housing 100. The display unit 200 may be wound or unwound by the roller unit 400.

The roller unit 400 includes a plurality of rollers 410, 420, and 430. In an embodiment, the roller unit 400 includes a first roller 410, a second roller 420 and a third roller 430. Each of the first to third rollers 410, 420, and 430 extends in the first direction DR1 and is arranged in the second direction DR2 inside the housing 100. The first to third rollers 410, 420, and 430 may be fixed to the housing 100. The first to third rollers 410, 420, and 430 may independently wind or unwind a plurality of members included in the display unit 200.

The display apparatus 1000 according to an embodiment of the present invention may further include a handle MB. The handle MB may have a rod shape extending in the first direction DR1. The handle MB fixes the display unit 200 and the support joint 300. One end of the display unit 200 may be fixed to the roller unit 400, and the other end of the display unit 200 may be connected to the handle MB. Also, one end of each of the joints 310 and 320 may be accommodated in the housing 100, and the other end of each of the joints 310 and 320 may be connected to the handle MB. Thus, when a user pulls the handle MB in the second direction DR2, the display unit 200 and the joints 310 and 320 accommodated in the housing 100 may be withdrawn from the housing 100.

In an embodiment, a length of the handle MB in the first direction DR1 may be greater than a width of the first opening OP1 in the first direction DR1. In an embodiment, a thickness of the handle MB in the third direction DR3 may be greater than a height of the first opening OP1 in the third direction DR3. Thus, even if the display unit 200 is wound and accommodated in the housing 100, the handle MB is not inserted into the housing 100.

Although not shown in the drawings, the display apparatus 1000 according to an embodiment of the present invention may further include a printed circuit board (not shown) and a driving IC (not shown) for driving the display unit 200. Also, the display apparatus 1000 according to an embodiment may further include a power unit (not shown) for driving the roller unit 400 and the support joint 300. For example, the power unit (not shown) may be a motor. The printed circuit board (not shown), the driving IC (not shown), and the power unit (not shown) may be accommodated in the housing 100.

Figure 3:
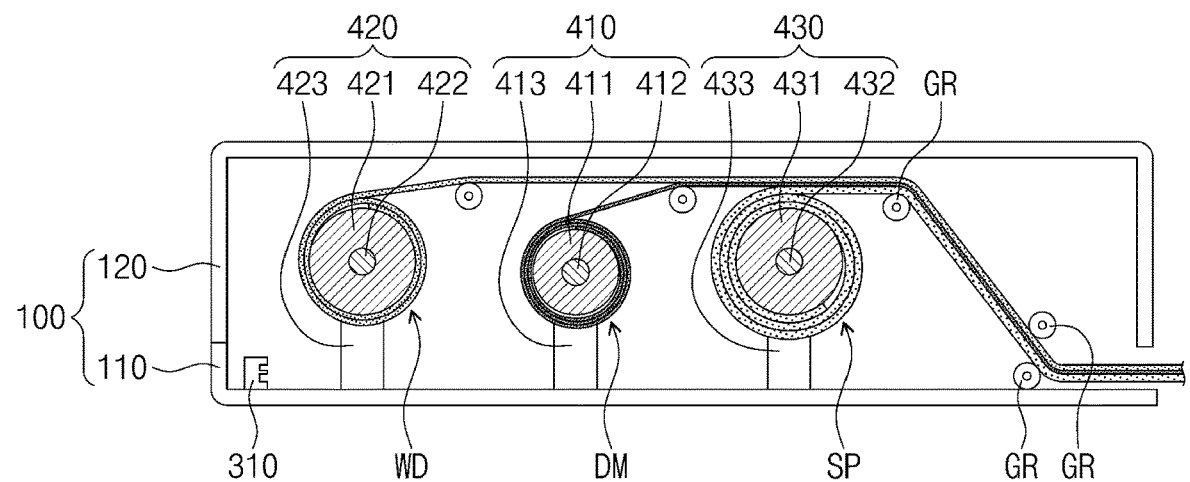
FIG. 3 is a cross-sectional view taken along line I-I' of FIG. 1.
Figure 3:
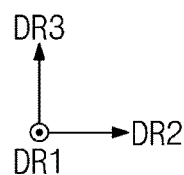
Figure 4:
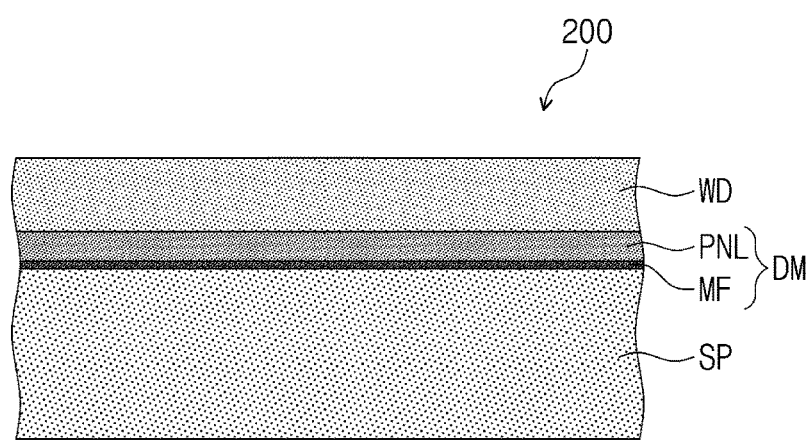
FIG. 4 is an enlarged cross-sectional view of a display unit according to an embodiment of the present invention.
Figure 4:
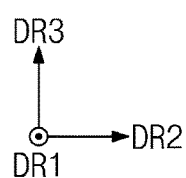

FIG. 3 is a cross-sectional view taken along line I-I' of FIG. 1; and FIG. 4 is an enlarged cross-sectional view of the display unit according to an embodiment of the present invention.

Referring to FIGS. 3 and 4, the display unit 200 according to an embodiment of the present invention includes a panel assembly DM, a protective film WD, and a support panel SP. When the display apparatus 1000 is in the open mode, the panel assembly DM exposed from the housing 100 is disposed between the protective film WD and the support panel SP.

The panel assembly DM includes a display panel PNL and an auxiliary film MF. In an embodiment, the display panel PNL and the auxiliary film MF are combined with each other to provide an integrated shape. For example, the display panel PNL and the auxiliary film MF may be combined with each other by an adhesive member (not shown).

The display panel PNL displays an image. In an embodiment, although not shown, the display panel PNL may include a plurality of organic light emitting elements (not shown).

The auxiliary film MF is disposed under the display panel PNL. The auxiliary film MF has a sheet shape. In an embodiment, the auxiliary film MF includes a magnetic material. For example, the auxiliary film MF may include an Invar (Ni—Fe) alloy.

When the display apparatus 1000 is in the open mode, the protective film WD exposed from the housing 100 is disposed on the panel assembly DM. The protective film WD covers a top surface that is a display surface of the display panel PNL. The protective film WD has light transmission properties. For example, the protective film WD may include at least one plastic film. Thus, the protective film WD may transmit an image provided from the display panel PNL to provide the image to the outside.

When the display apparatus 1000 is in the open mode, the support panel SP exposed from the housing 100 is disposed under the panel assembly DM. The support panel SP has rigidity greater than that of the display panel PNL. In an embodiment, the support panel SP includes a metal. For example, the support panel SP may include iron (Fe).

According to an embodiment, attractive force may be generated between the support panel SP and the auxiliary film MF by a magnetic material included in the auxiliary film MF. That is, coupling force between the support panel SP and the display panel PNL may increase.

In general, as the closed mode and the open mode of the display apparatus 1000 are repeated, a degree of fatigue applied to the display panel PNL may increase. That is, as the display panel PNL is repeatedly wound and unwound, when the display apparatus 1000 is in the open mode, the display panel PNL exposed to the outside of the housing 100 may not be maintained in a flat plate shape. That is, when the display apparatus 1000 is in the open mode, a partial region of the display panel PNL may be delaminated from the support panel SP. However, according to an embodiment, since the coupling force between the support panel SP and the display panel PNL is increased by the auxiliary film MF, when the display apparatus 1000 is in the open mode, the flat panel shape of the display panel PNL may be maintained more effectively.

Although, in an embodiment, the auxiliary film MF includes the magnetic material, and the support panel SP includes the metal, the present invention is not limited thereto. In another embodiment of the present invention, the support panel SP may include a magnetic material, and the auxiliary film MF may include a metal. In another embodiment, each of both the support panel SP and the auxiliary film MF may include a magnetic material.

As described above, the roller unit 400 (see FIG. 2) includes the first roller 410, the second roller 420, and the third roller 430. Each of the first roller 410, the second roller 420, and the third roller 430 extends in the first direction DR1. The first roller 410, the second roller 420, and the third roller 430 are arranged in the second direction DR2. In FIG. 3, although the second roller 420, the first roller 410, and the third roller 430 are sequentially arranged inward from the outside of the housing 100, the present invention is not limited to the arranged order, a size of each, and a vertical relationship of the rollers 410 to 430.

The first roller 410 winds or unwinds the panel assembly DM. In an embodiment, the first roller 410 is disposed between the second roller 420 and the third roller 430 in the second direction DR2. In an embodiment, the first roller 410 includes a first rotation cylinder 411, a first rotation shaft 412, and a first support 413.

The first rotation cylinder 411 has a cylindrical shape extending in the first direction DR1. The panel assembly DM may be wound around an outer surface of the first rotation cylinder 411.

The first rotation shaft 412 is disposed at a center of the first rotation cylinder 411. Particularly, the first rotation shaft 412 passes through the first rotation cylinder 411. The first rotation shaft 412 extends in the first direction DR1.

In an embodiment, the first support 413 is fixed to the inside of the housing 100. The first support 413 supports both ends of the first rotation shaft 412. In another embodiment of the present invention, the first support 413 may be omitted. In this case, the first rotation shaft 412 may be directly fixed to an inner surface of the housing 100.

The second roller 420 winds or unwinds the protective film WD. In an embodiment, the second roller 420 is disposed outside the first roller 410 in the second direction DR2. That is, the second roller 420 is disposed farther from the first opening OP1 (see FIG. 1) than the first roller 410.

In an embodiment, the second roller 420 includes a second rotation cylinder 421, a second rotation shaft 422, and a second support 423.

The second rotation cylinder 421 has a cylindrical shape extending in the first direction DR1. The protective film WD may be wound around an outer surface of the second rotation cylinder 421.

The second rotation shaft 422 is disposed at a center of the second rotation cylinder 421. Particularly, the second rotation shaft 422 passes through the second rotation cylinder 421. The second rotation shaft 422 extends in the first direction DR1.

In an embodiment, the second support 423 is fixed to the inside of the housing 100. The second support 423 supports both ends of the second rotation shaft 422. In another embodiment of the present invention, the second support 423 may be omitted. In this case, the second rotation shaft 422 may be directly fixed to the inner surface of the housing 100.

The third roller 430 winds the support panel SP. In an embodiment, the third roller 430 is disposed inside the first roller 410 in the second direction DR2. That is, the third roller 430 is disposed nearer to the first opening OP1 (see FIG. 1) than the first roller 410.

In an embodiment, the third roller 430 includes a third rotation cylinder 431, a third rotation shaft 432, and a third support 433.

The third rotation cylinder 431 has a cylindrical shape extending in the first direction DR1. The support panel SP may be wound around an outer surface of the third rotation cylinder 431.

The third rotation shaft 432 is disposed at a center of the third rotation cylinder 431. Particularly, the third rotation shaft 432 passes through the third rotation cylinder 431. The third rotation shaft 432 extends in the first direction DR1.

In an embodiment, the third support 433 is fixed to the inside of the housing 100. The third support 433 supports both ends of the rotation shaft 432. In another embodiment of the present invention, the third support 433 may be omitted. In this case, the third rotation shaft 432 may be directly fixed to the inner surface of the housing 100.

When the display apparatus 1000 is in the open mode, the panel assembly DM unwound from the first roller 410 is combined with a lower portion of the protective film WD unwound from the second roller 420 and then is unwound together in the second direction DR2. The support panel SP unwound from the third roller 430 is combined with a lower portion of the combination of the protective film WD and the panel assembly DM and then unwound together in the second direction DR2. When the display apparatus 1000 is in the open mode, the display unit 200 in which the protective film WD, the panel assembly DM, and the support panel SP are combined with each other may be withdrawn from the housing 100.

The display apparatus 1000 according to an embodiment of the present invention may include a plurality of guide rollers GR. The guide rollers GR may guide movement directions of the members WD, DM, and SP in a process in which the members WD, DM, and SP of the display unit 200 are combined with each other and are withdrawn. The position and number of the guide rollers GR illustrated in FIG. 3 are not particularly limited, and the size and number of the guide rollers GR may be variously set in the present invention.

According to an embodiment, some of the joints 310 and 320 (only the first joint 310 is illustrated) of the support joint 300 (see FIG. 1) are accommodated at the outermost side of the housing 100.

Figure 5:
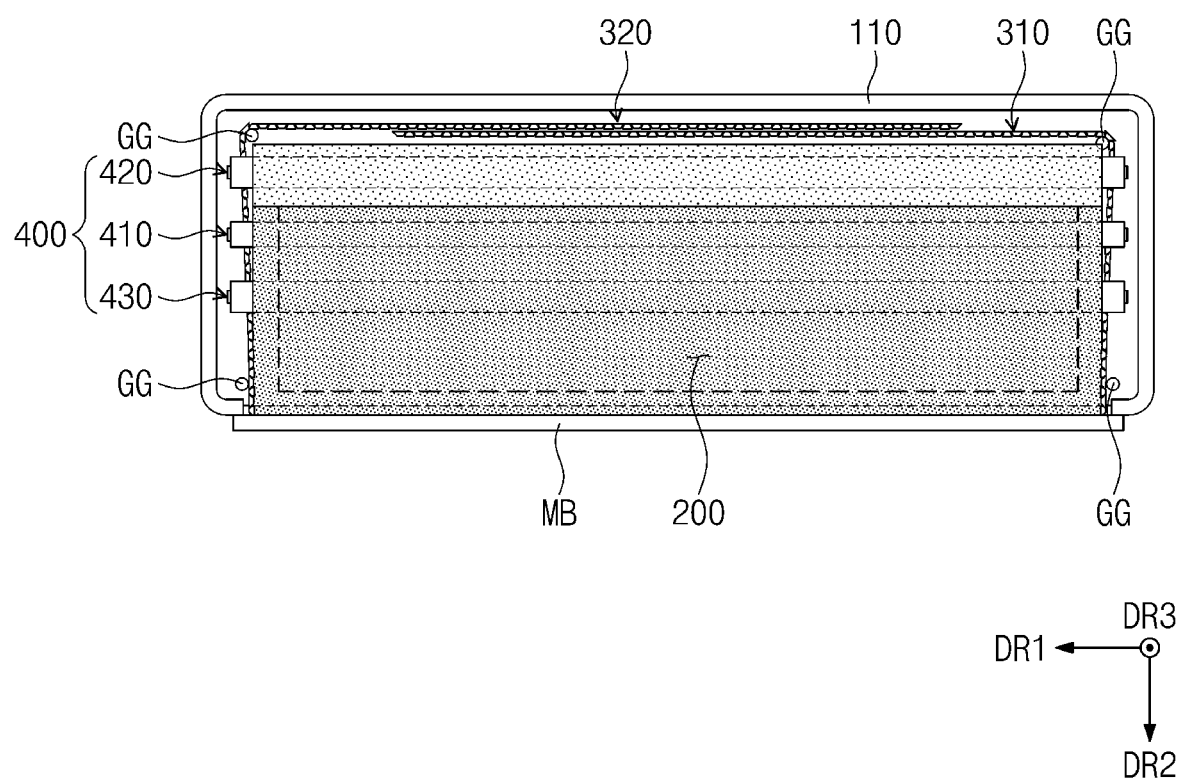
FIG. 5 is a plan view illustrating a state in which the display apparatus illustrated in FIG. 1 is in a closed mode.
Figure 6:
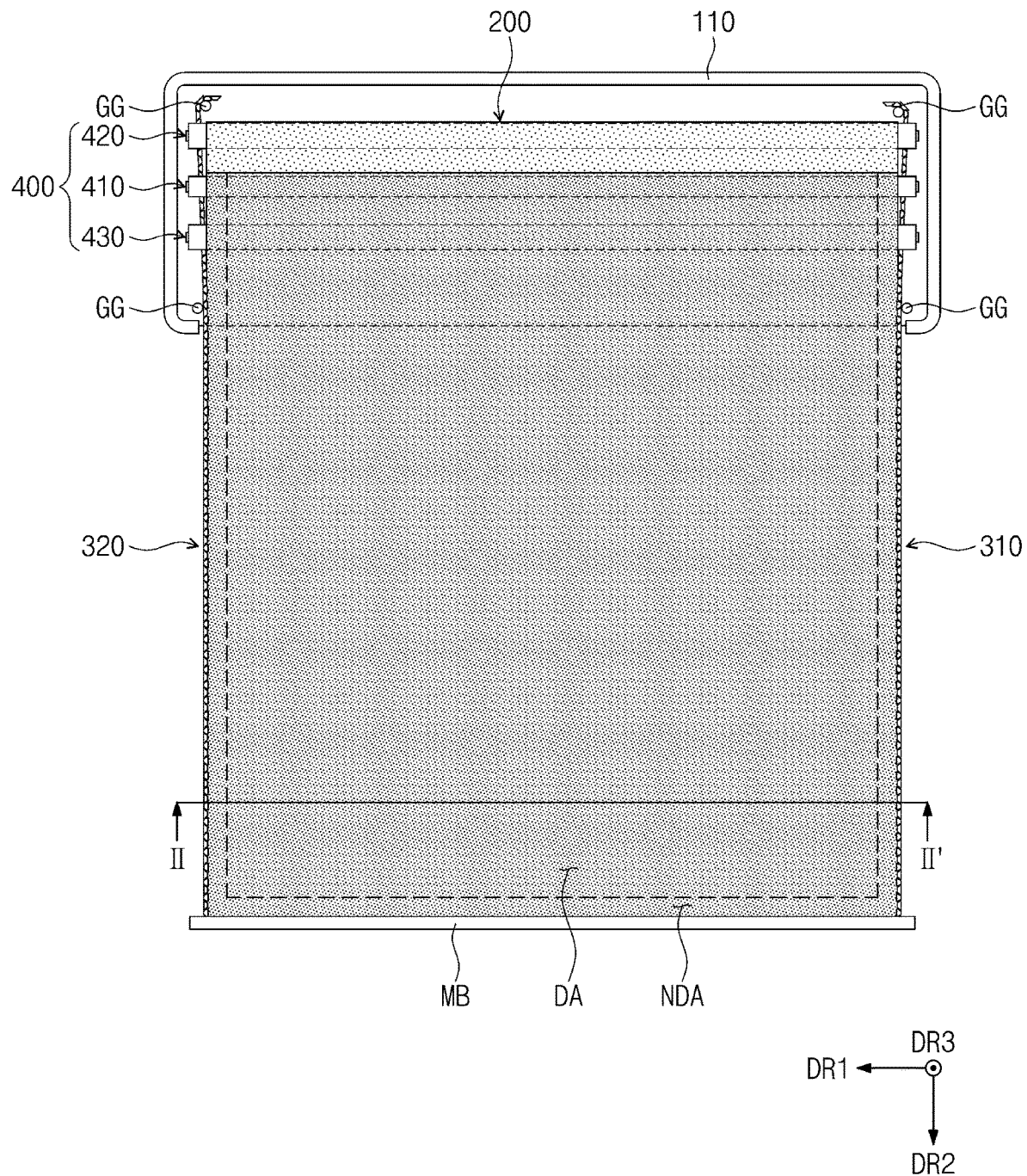
FIG. 6 is a plan view illustrating a state in which the display apparatus illustrated in FIG. 1 is in an open mode.

FIG. 5 is a plan view illustrating a state in which the display apparatus illustrated in FIG. 1 is in the closed mode; and FIG. 6 is a plan view illustrating a state in which the display apparatus illustrated in FIG. 1 is in the open mode. For convenience of explanation, the upper housing 120 is not illustrated in FIGS. 5 and 6.

Referring to FIGS. 5 and 6, when the display apparatus 1000 is in the open mode and the closed mode, a length of the display area DA of the display unit 200 in the second direction DR2 may vary. The display area DA corresponds to an area of the panel assembly DM (see FIG. 2) exposed to the outside of the housing 100.

When the display apparatus 1000 is in the closed mode, the joints 310 and 320 are accommodated in the housing 100. The joints 310 and 320 may be bent in a region (e.g., a predetermined region) within the housing 100 so as to be changed in an extension direction.

In an embodiment, as illustrated in FIG. 6, when the display apparatus 1000 is in the open mode, each of the joints 310 and 320 is connected to an edge of the display unit 200 in the first direction DR1 and then withdrawn together with the display unit 200. Here, each of the joints 310 and 320 extends outside the housing 100 in the second direction DR2.

As illustrated in FIG. 5, when the display apparatus 1000 is in the closed mode, the display unit 200 is wound around the roller unit 400 and inserted into the housing 100. Here, the joints 310 and 320 connected to the display unit 200 are spaced apart from the display unit 200 inside the housing.

When the display apparatus 1000 is in the closed mode, each of the joints 310 and 320 may be bent in a region (e.g., a predetermined region) within the housing 100 to extend in the first direction DR1. In an embodiment, the predetermined region is defined at the outermost side inside the housing 100 than the roller unit 400. That is, each of the joints 310 and 320 may be bent in a region defined further from the opening OP1 than a region in which the roller unit 400 is disposed.

Each of the joints 310 and 320 is bent in a direction toward the center of the housing 100 from the first direction DR1. Thus, the other end of each of the joints 310 and 320 facing one end of both ends of the joints 310 and 320, which connected to the handle MB, is accommodated in the predetermined region inside the housing 100. For example, as illustrated in FIG. 5, the other ends of the joints 310 and 320 are disposed adjacent to each other so as to overlap each other in a region outside the second direction DR2 of the roller unit 400.

The display apparatus 1000 according to an embodiment of the present invention may further include a plurality of guide gears GG for guiding a movement path of each of the joints 310 and 320. The guide gears GG are accommodated in the housing 100. The guide gears GG may be disposed in the predetermined region in which the joints 310 and 320 are bent. In this case, the guide gears GG may serve as guide shafts for guiding the joints 310 and 320 to be bent.

Also, the guide gears GG may be disposed in a region adjacent to the first opening OP1 (see FIG. 1). In this case, when the display unit 200 is withdrawn and inserted, the guide gears GG serve to change distances between the joints 310 and 320 and the display unit 200.

Although not shown in the drawings, at least one of the guide gears GG or the joints 310 and 320 may include a groove (not shown) or a protrusion (not shown) formed on each side surface. In this case, the guide gears GG may be engaged with inner surfaces of the joints 310 and 320 in a male and female coupling manner.

Although not shown in the drawings, the display apparatus 1000 according to another embodiment of the present invention may further include a guide rail (not shown). The guide rail (not shown) may be disposed inside the housing 100. The guide rail (not shown) may guide the movement path of each of the joints 310 and 320. In an embodiment, when the display apparatus 1000 includes the guide rail (not shown), the above-described guide gears GG may be omitted.

Figure 7:
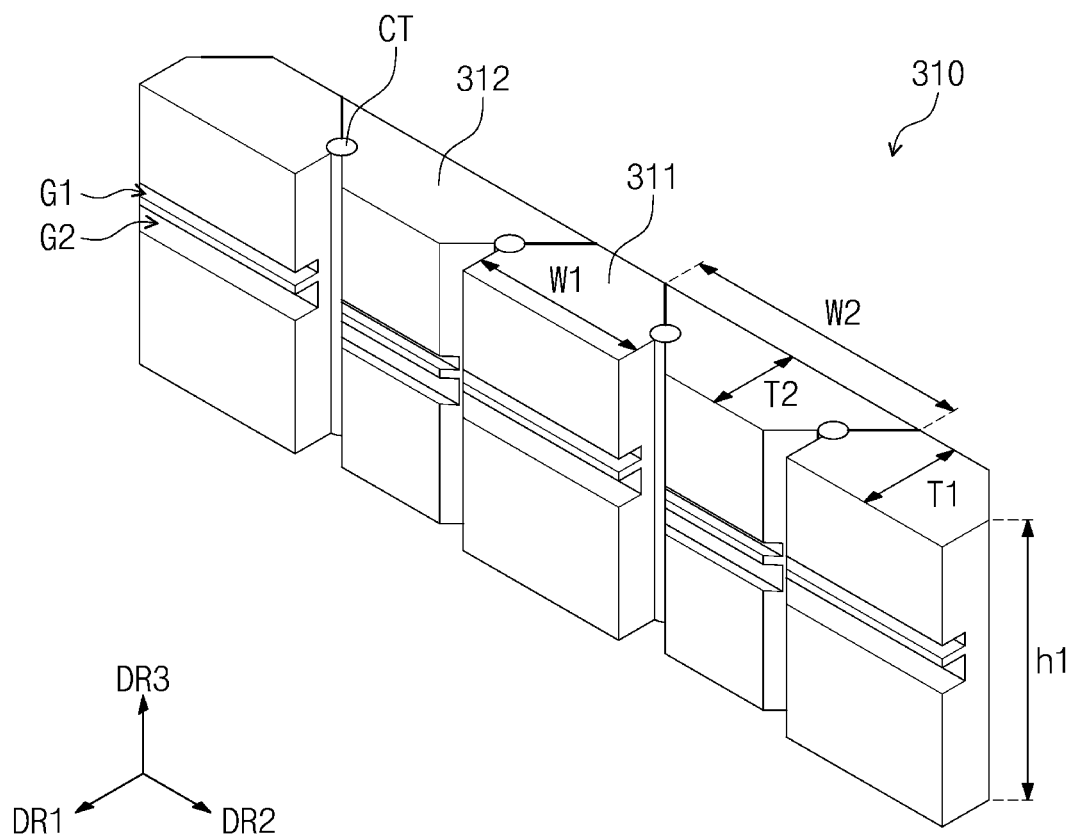
FIG. 7 is a perspective view illustrating a portion of one joint according to an embodiment of the present invention.

FIG. 7 is a perspective view illustrating a portion of one joint unit according to an embodiment of the present invention.

Figure 8A:
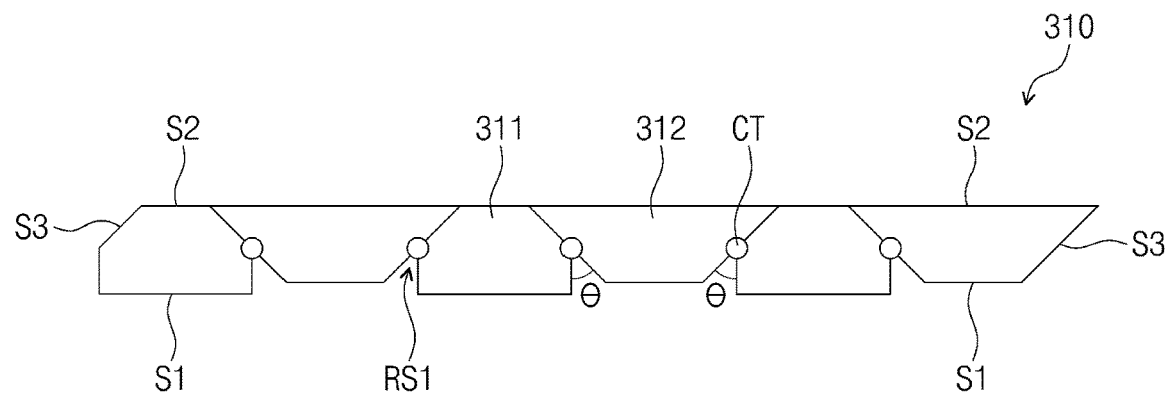
FIG. 8A is a plan view of the one joint illustrated in FIG. 7.
Figure 8B:
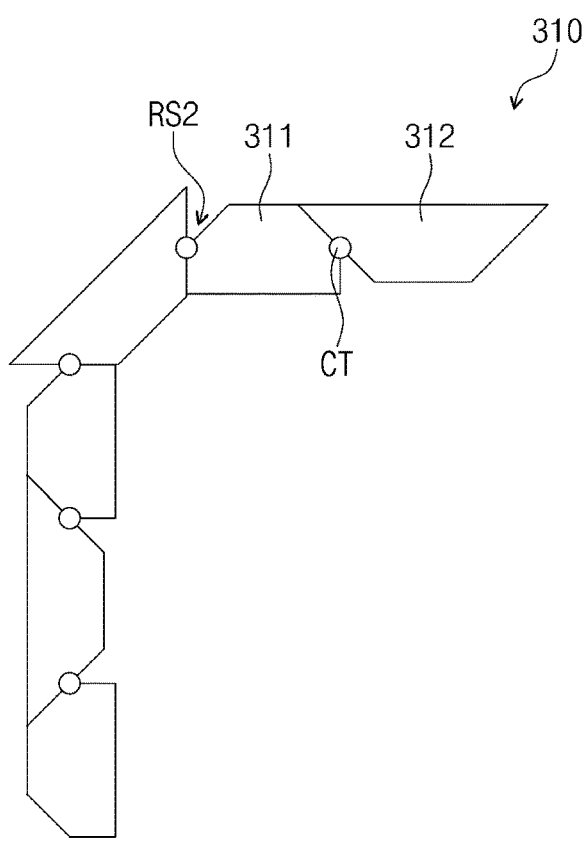
FIG. 8B is a plan view illustrating a state in which the one joint illustrated in FIG. 7 is bent.

FIG. 8A is a plan view of the one joint illustrated in FIG. 7; and FIG. 8B is a plan view illustrating a state in which the one joint illustrated in FIG. 7 is bent. Since the configuration of the second joint 320 may be the same as the configuration of the first joint 310, only the first joint 310 of the first and second joints 310 and 320 is illustrated for convenience of description.

Referring to FIGS. 7, 8A, and 8B, each of the joints 310 includes a plurality of joint units 311 and 312.

The plurality of joint units 311 and 312 includes first joint units 311 and second joint units 312. The first joint units 311 and the second joint units 312 are alternately disposed. Each of the first joint units 311 is disposed between the second joint units 312 adjacent to each other, and each of the second joint units 312 is disposed between the first joint units 311 adjacent to each other. The first joint units 311 and the second joint units 312 are connected to each other to provide a belt shape extending in a direction.

Each of the joints 310 further includes a plurality of connection members CT. The connection members CT are disposed between the first joint unit 311 and the second joint unit 312 to connect the first joint unit 311 to the second joint unit 312. In an embodiment, each of the connection members CT has a rod shape extending in the third direction DR3, but the present invention is not particularly limited to the shape of each of the connection members CT.

In the housing 100 (see FIG. 1), each of the first joint unit 311 and the second joint unit 312 may rotate about the connection member CT. As the first joint unit 311 and the second joint unit 312 rotate, the joint 310 may be bent in a direction (e.g., a predetermined direction). According to an embodiment, the joint 310 is not bent in any direction other than the predetermined direction.

According to an embodiment, each of the joint units 311 and 312 has a plate shape having a long side in the third direction DR3. For example, a height h1 of each of the joint units 311 and 312 may be in a range of about 6 mm to about 15 mm, and, in an embodiment, about 10 mm. Each of lengths W1 and W2 of the joint units 311 and 312 in the extension direction of the joint 310 may be in a range of about 3 mm to about 6 mm, and each of thicknesses T1 and T2 of the joint units 311 and 312 may be in a range of about 2 mm to about 3 mm.

The length W1 of the first joint unit 311 and the length W2 of the second joint unit 312 may be different from each other. Also, the thickness T1 of the first joint unit 311 and the thickness T2 of the second joint unit 312 may be different from each other.

According to an embodiment, the joint 310 is not bent in the third direction DR3. Since each of the first and second joint units 311 and 312 may have the plate shape having the height h1 of about 6 mm or more, and the side in the third direction DR3 among the sides of the first and second joint units 311 and 312 corresponds to the longest side, even though a pressure is applied to the joint 310 in the third direction DR3, the joint 310 may not bend in the third direction DR3.

Also, according to an embodiment, the joint 310 may be bent in the direction toward the center of the housing 100 (see FIG. 1) from the second direction DR2 and is not bent toward the outside of the housing 100 from the second direction DR2. That is, in the housing 100 (see FIG. 1), the joint 310 is bent in a direction surrounding the display unit 200 (see FIG. 1) on the plane and is not bent in a direction opposite to the direction surrounding the display unit 200 (see FIG. 5).

For example, as illustrated in FIG. 8A, a first spaced space RS1 is defined between the first joint unit 311 and the second joint unit 312.

Particularly, when the joint 310 is not bent, the first spaced space RS1 may be defined on a side surface of the joint 310 which faces the inside of the display apparatus 1000 (see FIG. 5). In the state in which the joint 310 is not bent, the first spaced space RS1 is not defined on the side surface of the joint 310 which faces the outside of the display apparatus 1000 (see FIG. 5). In the first spaced space RS1, as each of the first joint unit 311 and the second joint unit 312 rotates within a range of an angle (e.g., a predetermined angle) θ, the joint 310 may be bent to the inside of the display apparatus 1000. A size of the first spaced space RS1 is in inverse proportion to the degree of bending of the joint 310.

That is, the joint 310 is not bent to the outside of the display apparatus 1000 (see FIG. 5), in which the first spaced space RS1 is not defined.

When the joint 310 is in the bent state, a second spaced space RS2 may be defined on a side surface of the joint 310 which faces the outside of the display apparatus 1000 (see FIG. 5). In the second spaced space RS2, as the first joint unit 311 and the second joint unit 312 rotate, the bent joint 310 may be unfolded. A size of the second spaced space RS2 is proportional to the degree of bending of the joint 310.

Figure 9A:
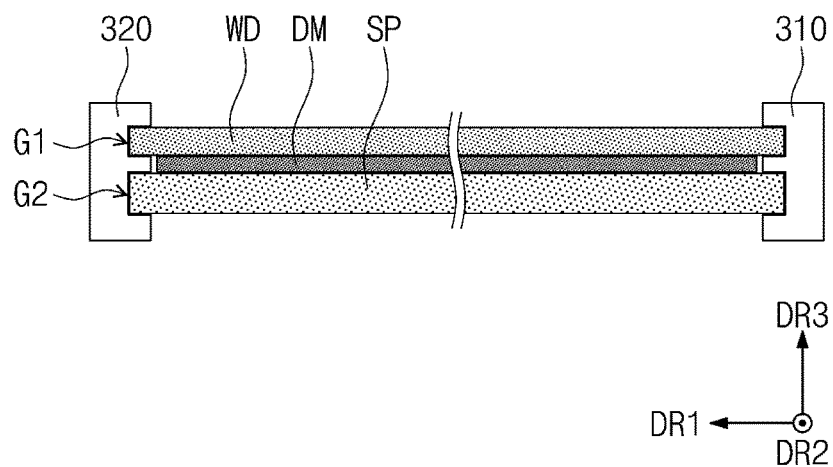
FIG. 9A is a cross-sectional view taken along line II-II' of FIG. 1.
Figure 9B:
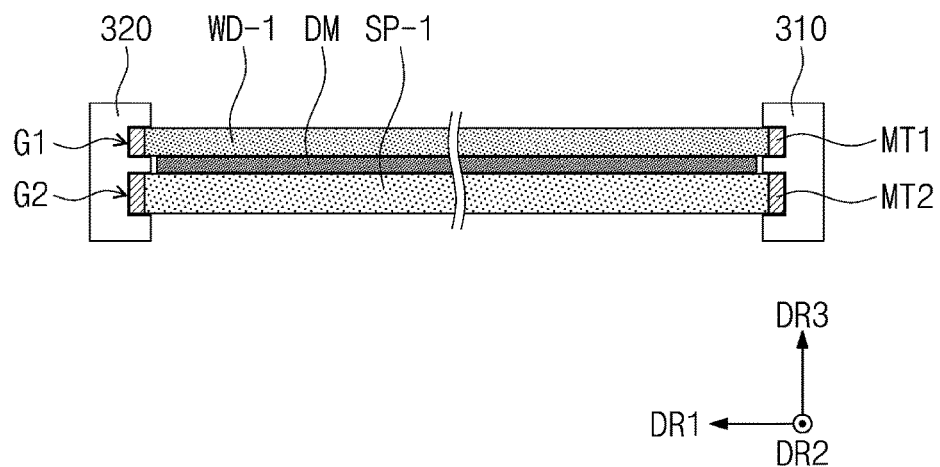
FIG. 9B is a cross-sectional view taken along line II-II' of FIG. 1, according to another embodiment of the present invention.

FIGS. 9A and 9B are cross-sectional views taken along line II-II' illustrated in FIG. 1.

Referring to FIG. 9A together with FIG. 7, a plurality of grooves G1 and G2 may be defined in each of the first joint units 311 and the second joint units 312 of the joints 310 and 320 according to an embodiment of the present invention. The plurality of grooves G1 and G2 are defined on an inner side of the display apparatus 1000 (see FIG. 5) among side surfaces of each of the first joint units 311 and the second joint units 312.

Each of the plurality of grooves G1 and G2 extends parallel to a longitudinal direction of each of the joints 310 and 320. The plurality of grooves G1 and G2 includes a first groove G1 and a second groove G2.

The first groove G1 is defined above the second groove G2. The first groove G1 is spaced apart from the second groove G2. In an embodiment, a length of the second groove G2 in the third direction DR3 is greater than that of the first groove G1 in the third direction DR3.

According to an embodiment, at least a portion of an edge region of the display unit 200 may be inserted into the grooves G1 and G2. Edge regions of the protective film WD in the first direction DR1 may be inserted to one-to-one correspond to the first groove G1 of the first joint 310 and the first groove G1 of the second joint 320.

Also, edge regions of the support panel SP in the first direction DR1 may be inserted to one-to-one correspond to the second groove G2 of the first joint 310 and the second groove G2 of the second joint 320. The panel assembly DM is not inserted into the grooves G1 and G2 of the joints 310 and 320.

In an embodiment, although the plurality of grooves G1 and G2 is defined in each of the joints 310 and 320, the present invention is not limited to the number of grooves G1 and G2 defined in each of the joints 310 and 320. For example, according to another embodiment of the present invention, one groove (not shown) may be defined in each of the joints 310 and 320 such that edge regions of all the members WD, DM, and SP included in the display unit 200 are accommodated into the groove (not shown).

Referring to FIG. 9B, a display unit according to another embodiment of the present invention may further include a plurality of coupling members MT1 and MT2 disposed on both edge regions of a protective film WD-1 in the first direction DR1 and both edge regions of a support panel SP-1 in the first direction, respectively. The coupling members MT1 and MT2 extend along both of the edge regions of the protective film WD-1 and the support panel SP-1, respectively.

According to an embodiment, the coupling members MT1 and MT2 include a magnetic material. Thus, when each of the protective film WD-1 and the support panel SP-1 are inserted into the first groove G1 and the second groove G2 of the joints 310 and 320, respectively, coupling force between the joints 310 and 320 and the display units WD-1 and SP-1 may increase by the coupling members MT1 and MT2. In another embodiment of the present invention, each of the joints 310 and 320 does not include a metal, and a separate magnetic member may be disposed at an inner surface of each of the first groove G1 and the second groove G2 of the joints 310 and 320.

In addition, although not shown in the drawings, in another embodiment of the present invention, the coupling members MT1 and MT2 include a metal material that does not have magnetism, and each of the joints 310 and 320 may include a magnetic material. Even in this case, the coupling force between the joints 310 and 320 and the display units WD-1 and SP-1 may be increased.

According to embodiments of the present disclosure, as the joints 310 and 320 support and fix the edge region of the rollable display unit 200, the display apparatus 1000 may be improved in durability. Also, according to embodiments of the present invention, since the joints 310 and 320 are capable of being inserted into and withdrawn from the housing 100, convenience of the display apparatus 1000 may be increased.

Figure 10:
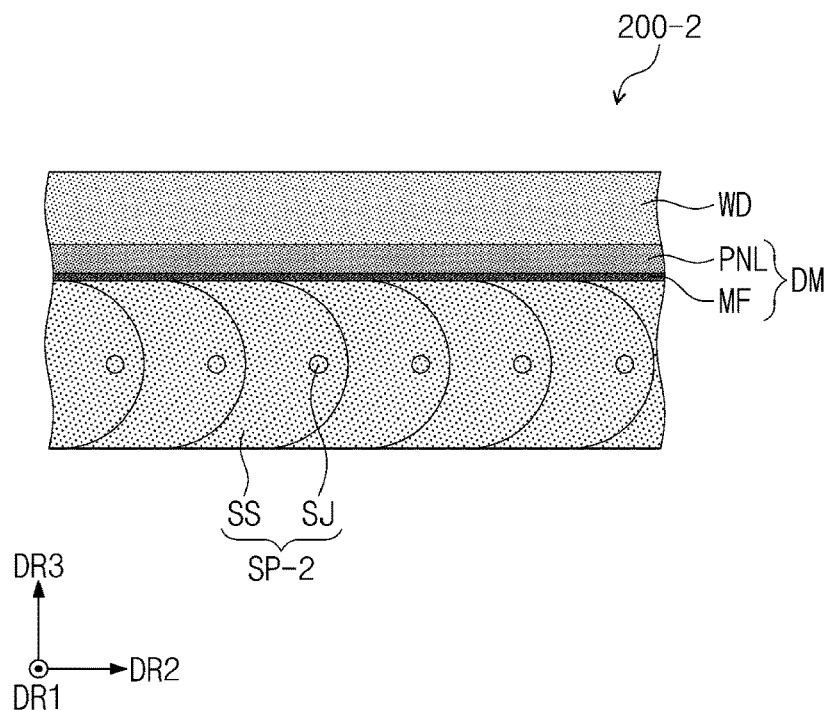
FIG. 10 is an enlarged cross-sectional view of a display unit according to another embodiment of the present invention.

FIG. 10 is an enlarged cross-sectional view of a display unit according to another embodiment of the present invention.

For convenience of description, differences between this embodiment and the foregoing embodiments will be mainly described, and omitted descriptions may be derived from the foregoing embodiments. Also, the same reference symbols is given to the same component, and duplicated descriptions with respect to the component may be omitted.

Referring to FIG. 10, a support panel SP-2 of a display unit 200-2 according to another embodiment of the present invention may be provided in a chain shape.

The support panel SP-2 according to an embodiment includes a plurality of support joint units SS and a plurality of connection members SJ connecting the support joint units SS to each other. The support joint units SS have a plurality of rod shapes extending in the first direction DR1. The support joint units SS exposed from the housing 100 (see FIG. 1) are arranged in the second direction DR2, which is a longitudinal direction of the support panel SP-2. The connection members SJ connect the support joint units SS adjacent to each other. Each of the connection members SJ may be a hinge. In the housing 100 (see FIG. 1), the support joint units SS may rotate about the connection member SJ connected to each of the support joint units SS. The rotating support joint units SS are accommodated in the housing 100.

Figure 11:
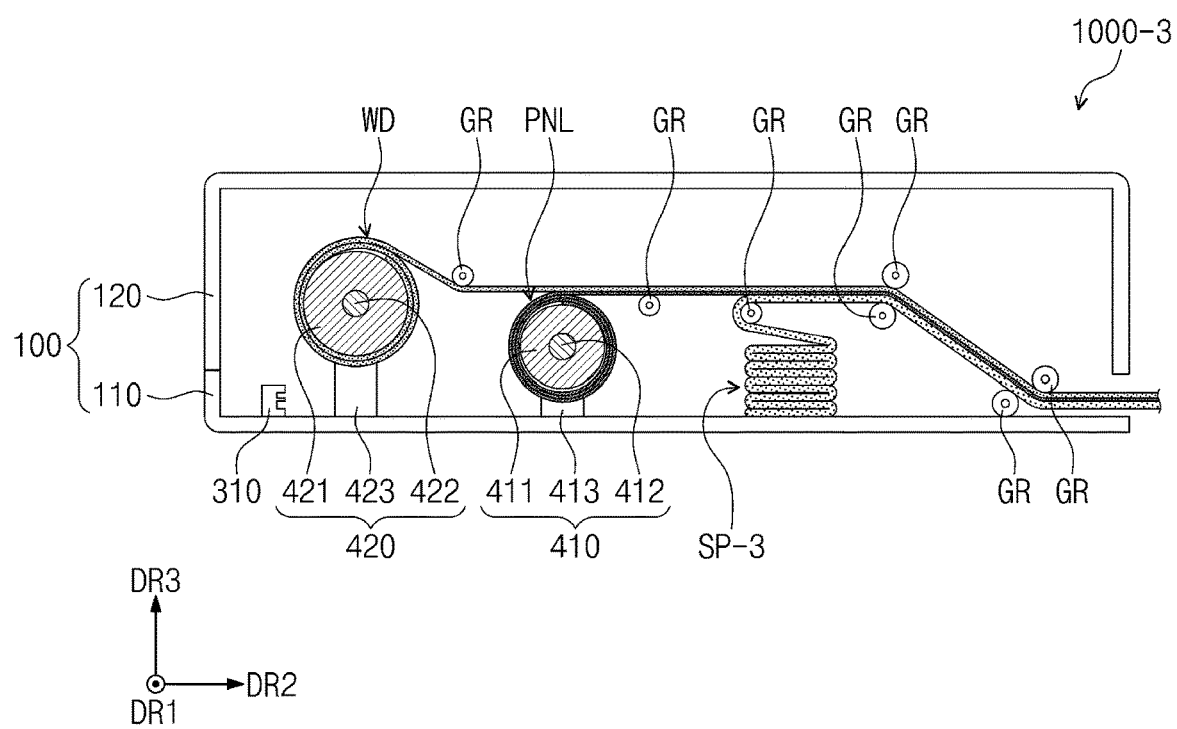
FIG. 11 is a cross-sectional view of a display apparatus according to another embodiment of the present invention.

FIG. 11 is a cross-sectional view of a display apparatus according to another embodiment of the present invention.

For convenience of description, differences between this embodiment and the foregoing embodiments will be mainly described, and omitted descriptions may be derived from the foregoing embodiments. Also, the same reference symbol is given to the same component, and duplicated descriptions with respect to the component may be omitted.

Referring to FIG. 11, roller units 410 and 420 of a display apparatus 1000-3 according to another embodiment of the present invention include only a first roller 410 and a second roller 420. That is, the roller unit according to an embodiment does not include the above-described third roller 430.

Thus, a support panel SP-3 may be accommodated in a housing 100 in a shape that is freely folded in an area (e.g., a predetermined area) within the housing 100, in a state of not being wound around a roller.

Figure 12:
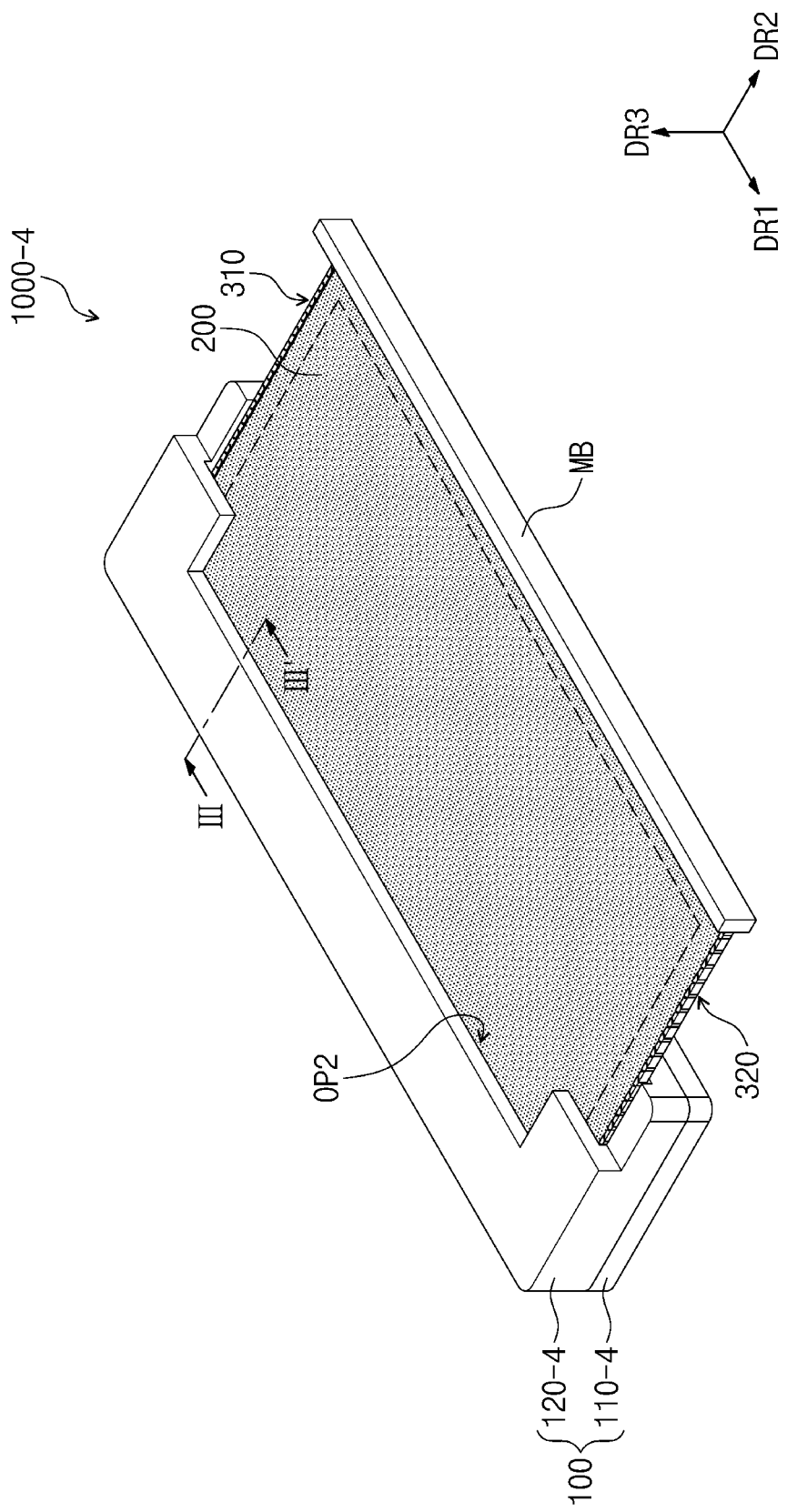
FIG. 12 is a perspective view of a display apparatus according to another embodiment of the present invention.
Figure 13:
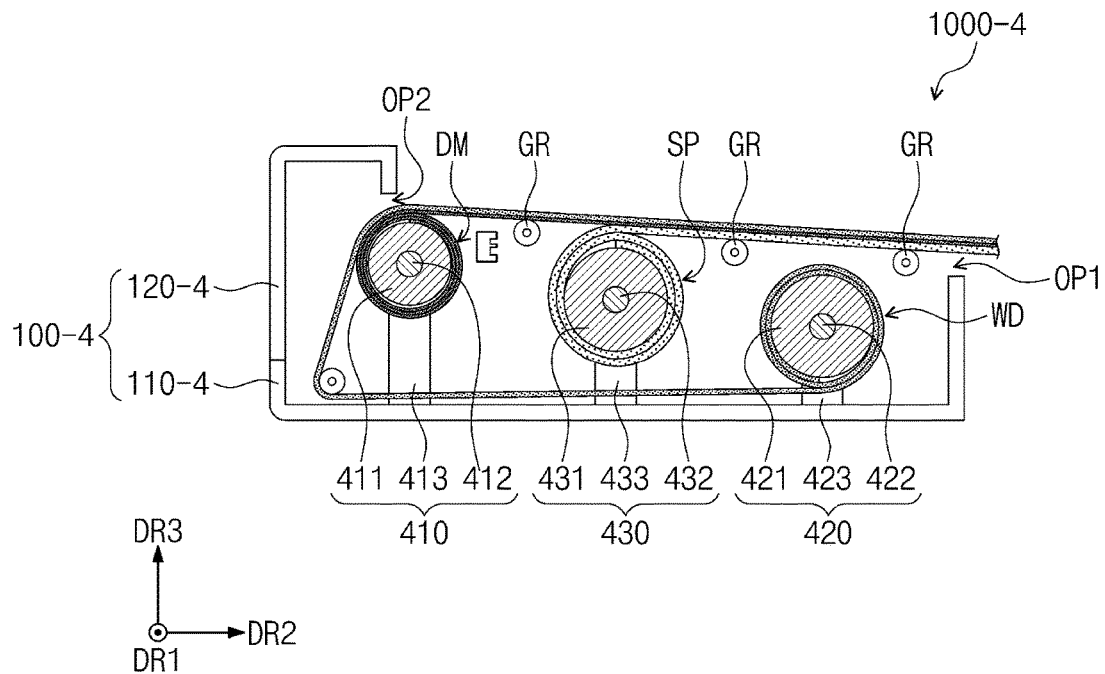
FIG. 13 is a cross-sectional view taken along line III-III' of FIG. 12.
Figure 14:
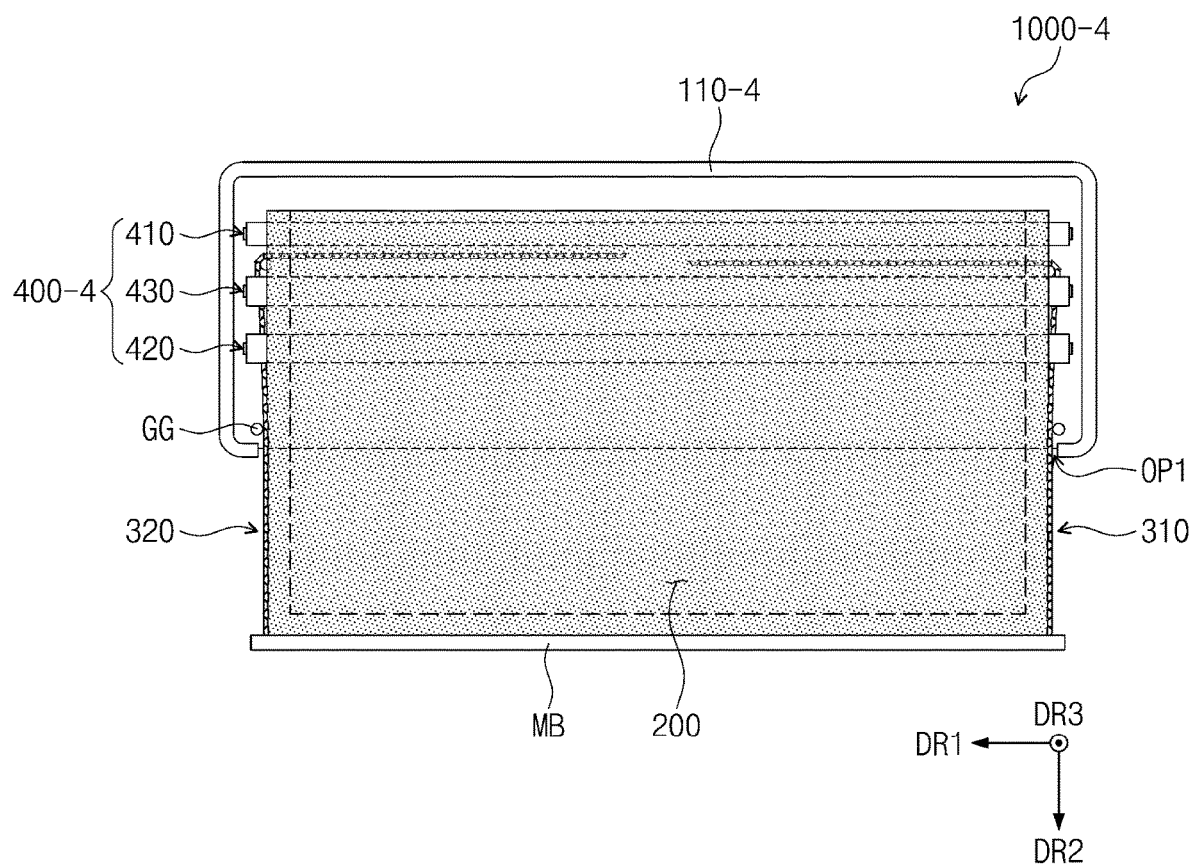
FIG. 14 is a plan view of the display apparatus illustrated in FIG. 12.

FIG. 12 is a perspective view of a display apparatus according to an embodiment of the present invention; and FIG. 13 is a cross-sectional view taken along line I-I' of FIG. 12. FIG. 14 is a plan view of the display apparatus illustrated in FIG. 12.

For convenience of description, differences between this embodiment and the foregoing embodiments will be mainly described, and omitted descriptions may be derived from the foregoing embodiments. Also, the same reference symbol is given to the same component, and duplicated descriptions with respect to the component may be omitted.

Referring to FIGS. 12 to 14, a first roller 410 among a plurality of rollers 410, 420, and 430 according to another embodiment of the present invention is disposed at the outermost side in the second direction DR2. For example, as illustrated in FIGS. 13 and 14, the plurality of rollers 410, 420, and 430 is arranged in order of a first roller 410, a third roller 430, and a second roller 420 in a direction toward the inside from the outside of a housing 100-4. However, in another embodiment of the present invention, the positions of the second roller 420 and the third roller 430 may be reversed with each other.

According to an embodiment, since a distance between the first roller 410 and a first opening OP1 increases, an area of an unwound panel assembly DM may be increased.

According to an embodiment, a second opening OP2 may be defined in a side of an upper housing 120-4 in the second direction DR2. The second opening OP2 overlaps a portion of a lower housing 110-4 on the plane. Thus, some of the members accommodated in the housing 100-4 may be exposed by the second opening OP2. That is, a partial area of the panel assembly DM that is not withdrawn from the first opening OP1 may be exposed by the second opening OP2. The partial area of the exposed panel assembly DM may be in an unwound state. Thus, according to an embodiment, a display area DA of a display unit 200 may be increased.

As illustrated in FIGS. 12 and 13, in an embodiment, even when the second opening OP2 is provided in a non-deformable shape so that the display apparatus 1000-4 is in a closed mode, a portion of the display unit 200 is exposed. However, the present invention is not limited thereto. For example, although not shown in the drawings, according to another embodiment of the present invention, the upper housing 120-4 is provided with a separate cover member (not shown). Thus, when the display apparatus 1000-4 is in a closed mode, the second opening OP2 may be covered by a cover member (not shown).

Also, as illustrated in FIGS. 13 and 14, according to an embodiment, portions of the bent joints 310 and 320 may be disposed inward from the first roller 410 in the second direction DR2. That is, portions of the joints 310 and 320 that are bent to extend in the first direction DR1 are accommodated in a region adjacent to the first opening OP1 rather than the first roller 410 in the second direction DR2. For example, the joints 310 and 320 are accommodated in a space between the first roller 410 and the third roller 430 or the third roller 430 and the second roller 420.

According to an embodiment, since the space in which the joints 310 and 320 are accommodated is defined between the first roller 410, which winds the panel assembly DM for displaying an image, and the first opening OP1, a dead space may be decreased.

It will be apparent to those skilled in the art that various modifications and variations can be made in the present invention. Thus, it is intended that the present invention covers the modifications and variations of this invention provided they come within the scope of the appended claims and their equivalents. Thus, to the maximum extent allowed by law, the scope of the present invention is to be determined by the broadest permissible interpretation of the following claims and their equivalents, and shall not be restricted or limited by the foregoing detailed description.

In the use of the rollable display, the plurality of joints that are capable of being inserted into and withdrawn from the housing may stably fix the flexible display to improve the durability and convenience of the display apparatus. Therefore, embodiments of the present invention have high industrial applicability.

The invention claimed is:

1. A display apparatus comprising:
a display unit having flexibility;
at least one roller extending in a first direction to wind or unwind the display unit;
a plurality of joints extending along an edge region of the display unit; and
a housing in which the display unit, the at least one roller, and the plurality of joints are accommodated and into/and from which the display unit and the plurality of joints are to be inserted and withdrawn,
wherein the display unit comprises:
a display panel having flexibility and in which a display area to display an image is changed as the display unit is wound around or unwound from a roller of the at least one roller;
a protective film above the display panel; and
a support panel below the display panel.

2. The display apparatus of claim 1, wherein the joints are connected to both edges of the display panel in the first direction to extend in a second direction perpendicular to the first direction on a plane outside the housing, and
the joints are bent in a direction toward a center of the housing from the first direction to extend in the first direction inside the housing.

3. The display apparatus of claim 2, wherein the joints are not bent in directions other than the direction toward the center of the housing from the first direction.

4. The display apparatus of claim 3, wherein the joints are bent to be accommodated at the outermost side in the second direction inside the housing.

5. The display apparatus of claim 3, wherein each of the joints comprises:
a plurality of joint units arranged along the extension direction of the joints; and
a connection member configured to connect adjacent joint units to each other among the plurality of joint units, wherein each of the joint units rotates about the connection member.

6. The display apparatus of claim 5, wherein at least one groove extending parallel to the extension direction of the joint is defined in a surface of each of the joint units, and
an edge region of at least a portion of the display unit is inserted into the groove.

7. The display apparatus of claim 6, wherein the groove is provided as a plurality of grooves, and
each of the plurality of grooves comprises:
a first groove into which an edge region of the protective film is inserted; and
a second groove into which an edge region of the support panel is inserted.

8. The display apparatus of claim 3, wherein the display unit further comprises a coupling member arranged along the edge region of the display unit, and
at least one of the coupling member or the joints comprises a magnetic material.

9. The display apparatus of claim 1, wherein the joints are accommodated to be spaced apart from the display unit inside the housing.

10. The display apparatus of claim 1, wherein the roller is provided as a plurality of rollers, and
the plurality of rollers comprises:
a first roller configured to wind the display panel; and
a second roller configured to wind the protective film,
wherein the display panel and the protective film are combined with each other inside the housing and are withdrawn to the outside of the housing.

11. The display apparatus of claim 10, wherein the first and second rollers are arranged in a second direction perpendicular to the first direction on a plane, and
the first roller is arranged at the outermost side of the housing.

12. The display apparatus of claim 11, wherein the joints are bent inside the housing and accommodated inside the first roller in the second direction.

13. The display apparatus of claim 12, wherein a first opening and a second opening are defined in the housing,
the display unit and the joints are inserted and withdrawn through the first opening, and
a portion of the display panel, which is not withdrawn from the first opening, is exposed by the second opening.

14. The display apparatus of claim 10, wherein the plurality of rollers further comprises a third roller configured to wind the support panel, and
the display panel, the protective film, and the support panel are combined with each other inside the housing and withdrawn to the outside of the housing.

15. The display apparatus of claim 10, wherein the display unit further comprises an auxiliary film which is wound together with the display panel and disposed between the display panel and the support panel as the display unit is unfolded, and
at least one of the auxiliary film or the support panel comprises a magnetic material.

16. The display apparatus of claim 15, wherein the support panel comprises a metal.

17. The display apparatus of claim 15, wherein the support panel has a chain shape comprising the plurality of joints.

18. The display apparatus of claim 1, further comprising a handle which extends in the first direction, is connected to an end of the display unit and an end of each of the joints, and faces the housing in a second direction perpendicular to the first direction on a plane.

19. A display apparatus comprising:
a display unit which is rollable about a rotation shaft extending in a first direction, unfolded in a second direction perpendicular to the first direction, and configured to display an image;
a plurality of joints, which extend along sides of the display unit, which are parallel to the second direction, and fix the sides of the display unit, which are parallel to the second direction; and
a housing in which the rotation shaft, the display unit, and the plurality of joints are accommodated and into and from which the display unit and the plurality of joints are to be inserted or withdrawn,
wherein each of the joints is bent in a direction surrounding the display unit on a plane and is not bent in a direction opposite to the direction surrounding the display unit inside the housing.

20. A display apparatus comprising:
at least one roller;
a display unit wound or unwound by the at least one roller;

a plurality of joints connected to an edge region of the display unit to fix the display unit; and a housing in which the display unit, the roller, and the plurality of joints are accommodated and into and from which the display unit and the plurality of joints are inserted and withdrawn, wherein the display unit comprises:

a display panel configured to display an image and be inserted into and withdrawn from the housing such that an area of a display area varies;

an auxiliary film below the display panel and comprising a magnetic material; and a support panel below the auxiliary film and comprising a metal material.

* * * * *